United States Patent [19]

Gajajiva

[11] 4,060,264
[45] Nov. 29, 1977

[54] SWIVEL CONDUIT COUPLING ASSEMBLY

[75] Inventor: Padej Gajajiva, Elmhurst, N.Y.

[73] Assignee: I-T-E Imperial Corporation Efcor Division, East Farmingdale, N.Y.

[21] Appl. No.: 696,545

[22] Filed: June 16, 1976

[51] Int. Cl.² .............................................. F16L 15/00
[52] U.S. Cl. .................................... 285/175; 285/369; 285/390; 285/417
[58] Field of Search ................. 285/175, 390, 391, 32, 285/417, 12, 369, 355, 333, 334, 354, 272, 281

[56] References Cited

U.S. PATENT DOCUMENTS

| 278,800 | 6/1883 | Kline | 285/175 |
|---|---|---|---|
| 2,906,152 | 9/1959 | Brase | 285/175 X |
| 2,926,027 | 2/1960 | Marquis, Jr. | 285/175 X |
| 3,461,877 | 8/1969 | Morch | 285/32 X |
| 3,871,692 | 3/1975 | Brownfield | 285/390 |

FOREIGN PATENT DOCUMENTS

| 1,104,282 | 6/1955 | France | 285/12 |

Primary Examiner—Thomas F. Callaghan
Attorney, Agent, or Firm—Friedman, Goodman & Teitelbaum

[57] ABSTRACT

The present invention provides a coupling member for joining two generally coaxial, tubular members such as an electrical conduit. The coupling member includes internal left hand threads at one end and internal right hand threads at the other end with an annular groove therebetween. One end of a first conduit is provided with two sets of axially spaced apart external left hand threads. The coupling member is rotated so that the left hand threads thereof matingly engage the first set of left hand threads on the conduit and then is temporarily locked by engagement of the second set of left hand threads. The first set of left hand threads on the conduit will then be in the annular groove defined between the left and right hand threads of the coupling member. A standard length of a second conduit having external right hand threads thereon may then be matingly engaged with the right hand threads of the coupling member. After a few threads of the second conduit are engaged, the coupling member is disengaged from the second set of left hand threads of the first conduit so that the coupling member is free to rotate relative to the first conduit, whereby the coupling member can be rotated to fully engage the second conduit thereto. If desired, a sealing ring may be placed in the annular groove in the coupling member so that the end faces of the two conduits may bear against the opposed transverse faces of the sealing ring.

8 Claims, 5 Drawing Figures

SWIVEL CONDUIT COUPLING ASSEMBLY

BACKGROUND OF THE INVENTION

This invention relates generally to couplings for electrical conduits or the like. More particularly, this invention relates to an improved swivel coupling and mating conduit as well as the method for assembling same which provides for a temporary locking connection therebetween to aid in the connection thereof to another conduit.

In attaching a coupling member to an electrical conduit containing electrical conductors, the coupling member must be threaded tightly but not too tightly or the threads would strip. It is also a common requirement of the coupling means of the type to which the present invention is directed that a seal be provided since in many environments liquids may be splashed on the conductors and, additionally, moisture in the air could enter the conduit via the smallest opening in the coupling and be condensed and trapped in the threads therein thus enhancing corrosion and poor electrical connections. Liquid that is present in the conduit could possible short out the conductors.

There are many examples of prior art in the general field to which the present invention is directed. One such example which provides a temporary locking arrangement is disclosed in the U.S. patent application Ser. No. 669,444 filed on Mar. 23, 1976, and assigned to the assignee of the present invention. In the aforementioned, co-pending application, the coupling is comprised of an elongated sleeve having internal threads at one end thereof. The opposite end of the sleeve is deformable and is initially flared outwardly. A radially inwardly extending lip is formed integrally with one end of the deformable section and is adapted to engage an annular groove formed on the exterior surface of a length of conduit. When the external groove is formed on the conduit, it will be evident that conventional threads are not required at that end. The opposite end of the coupling is threaded in a conventional manner so as to receive the theaded end of the conduit and an annular seal ring may be provided between the confronting ends of the two members that are to be joined.

While the copending application referred to hereinabove does overcome many swiveling problems present in the prior art, it will be evident that the construction requires the absence of threads at one end of the conduit, even though swiveling is required and is achieved. The temporary locking of one conduit to another is achieved by means other than threads. As will be made evident from the discussion that follows, the present invention provides a fully threaded, swivel coupling between adjacent conduit ends.

SUMMARY OF THE INVENTION

In contrast to the prior art described hereinabove, the present invention, in one aspect thereof, provides a threaded coupling member that is adapted to matingly engage threads on one end of a conduit as well as threads on one end of the next adjacent conduit. The coupling member of the present invention is provided with left hand threads at one end thereof and right hand threads at the other end thereof with an annular space between the two sets of threads. The right hand threads at one end of the coupling member of this invention mate, in a conventional manner, with the right hand threads that are normally formed on the end of a length of conduit. However, the next adjacent conduit is provided with two sets of left hand threads which, under selected conditions, are intended to mate with the left hand threads of the coupling member.

A swivel connection is achieved utilizing the method and structure of the present invention by virtue of the fact that the two sets of left hand threads on the end of the conduit are axially spaced apart in order to define an annular groove. When in the swiveling mode, the left hand threads of the coupling member first engage and completely traverse the endmost set of left hand threads on the conduit and then fall into the annular groove defined between the two sets of left hand threads on the conduit. At the same time, the endmost left hand threads on the conduit will fall into the annular groove defined between the left hand and the right hand threads on the coupling member. Thus, at this particular time, there will be no threaded engagement between the coupling member and that conduit having left hand threads thereon although the coupling member cannot be disassembled from the conduit without unthreading in the opposite direction. Therefore, there will be relative rotational or swiveling movement permitted between the coupling member and the conduit having the left hand threads. Thus, the coupling member can be threaded at its end having right hand threads to the next adjacent length of conduit and there will be relative rotational movement permitted between the two adjacent lengths of conduit.

In order to at least temporarily couple two adjacent lengths of conduit to each other, the coupling member is further advanced so that the left hand threads thereof ride out of the annular groove defined between the two sets of left hand threads and then engage the axially inward set of left hand threads on the conduit to provide a temporary locked connection therebetween. The coupling member may then be threaded easily onto a few threads of the next adjacent length of conduit using the conventional right hand threads thereof. The coupling member is then unlocked from the first conduit and rotated to fully engage the next adjacent conduit.

If desired, an annular seal ring may be positioned in the coupling member adjacent the inner end of the right hand threads thereof. When the two lengths of conduit are threaded in completely, the opposed end faces of the adjacent lengths of conduit bear against the opposed, transverse faces of the annular seal ring to provide a seal therebetween.

Accordingly, it is an object of the present invention to provide an improved swivel coupling for lengths of conduit.

It is another object of the present invention to provide an improved coupling member for a swivel connection to a length of conduit, where the coupling member can be temporarily locked to the conduit.

It is a further object of the present invention to provide a seal ring in a swivel connection for two adjacent lengths of conduit.

Yet another object of the present invention is to provide a coupling member, as described above, wherein left hand threads are employed to matingly engage left hand threads on the end of a length of conduit and wherein the coupling member is further provided with right hand threads to matingly engage the right hand threads on the next adjacent length of conduit.

Still another object of the present invention is to provide an improved method for coupling adjacent lengths of conduit to each other.

Still a further object of the present invention is to provide an improved method, as described above, wherein the coupling member is secured to a first length of conduit by rotating the coupling member in a direction opposite to the conventional direction of rotation of threads.

Still another object of the present invention is to provide a method for at least temporarily locking a length of conduit to a coupling member utilizing mating left hand threads on the coupling member and the length of conduit so that mating right hand threads on the coupling member can engage right hand threads on another length of conduit.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
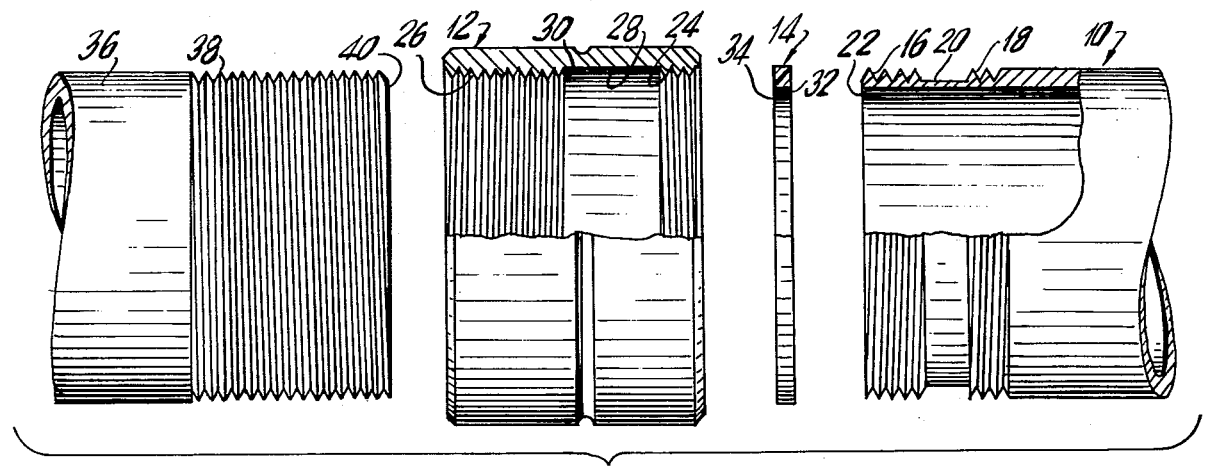
FIG. 1 is an exploded side elevational view, partially broken away and partially in section, illustrating the components comprising one embodiment of the present invention.

Referring first to FIG. 1 there is shown one embodiment of the present invention which comprises a first length of conduit 10, a coupling member 12, and a seal ring 14.

The length of conduit 10 is provided at one end thereof with a first set of left hand NS threads 16 and a second of left hand NS threads 18 which are axially spaced apart from the first set of threads 16 in order to define an annular groove 20 therebetween. The opposite end of the length of conduit 10 (which is not shown) is conventional, being externally threaded with a standard pipe thread. It will be noted, particularly in FIG. 1, that there are a comparatively large number of threads 16 as compared to the threads 18. Typically, there may be between 1 ½ to 2 of the threads 18. The threads 16 terminate at a transverse end face 22.

The coupling member 12 is provided with a first set of internal, left hand NS threads 24 that mate with the threads 16 and 18 on the conduit 10 as will be described hereinafter. In addition, and axially spaced apart from the threads 24, the coupling member 12 is provided with internal conventional standard pipe threads 26 which, in combination with the threads 24 define an annular internal groove 28 therebetween. The annular groove 28, in combination with the innermost end of the threads 26 define a seat 30.

The seal ring 14, which may be made of Teflon, nylon or any other suitable material, is provided with transverse end faces 32 and 34. In the temporarily locked condition which will be described hereinafter, the end face 22 of the length of conduit 10 bears against the end face 32 of the seal ring 14 while the transverse end face 34 of the seal ring 14 bears against the seat 30 formed at the right hand or innermost ends of the threads 26 of the coupling member 12.

The next adjacent length of conduit 36 is provided with a standard pipe thread 38 and a transverse face 40 at one end thereof. The threads 38 are arranged to matingly engage the threads 26 of the coupling member 12. Usually, the conduit 36 is fixed or stationary, having been already connected at the other end to a fitting, a pipe or the like, where the conduit 10 is to be connected thereto in such a manner which does not require the conduit 36 to be moved or rotated.

Figures 2, 3:
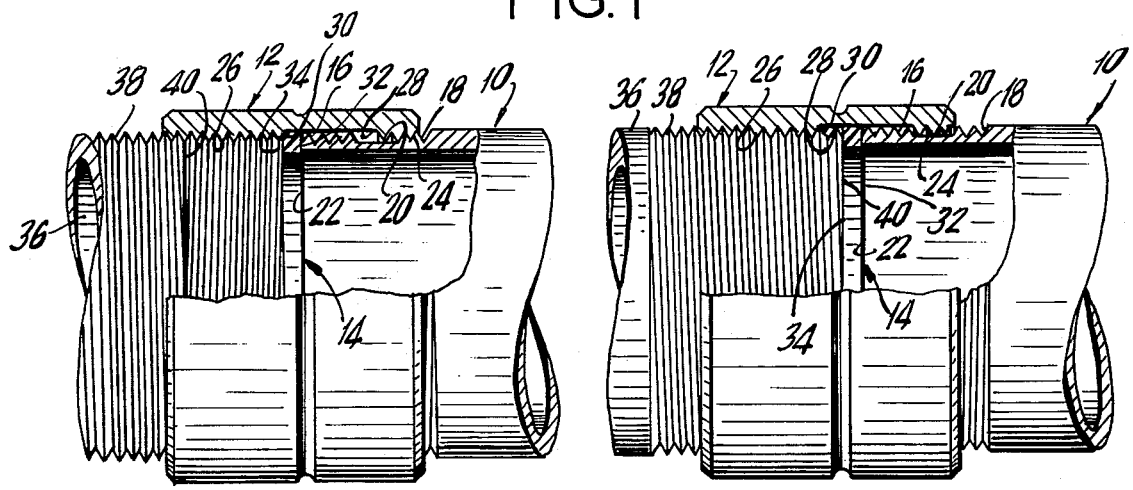
FIG. 2 is a side elevational view, partially broken away and partially in section, illustrating an intermediary step in the assembly of the components comprising the present invention.
FIG. 3 is a longitudinal elevational view, partially broken away and partially in section and similar to FIG. 2, illustrating the present invention in the swivel mode of operation.

As shown in FIG. 2, a few of the threads 26 of the coupling member 12 threadably engage the threads 38 of the length of conduit 36. However, the threads 24 of the coupling member 12, already matingly engage the set of threads 18 of the length of conduit 10 with the seal ring 14 being initially positioned against the seat 30 of the coupling member 12 and the transverse end face 22 of the length of conduit 10. Thus, the coupling member 12 is temporarily locked onto the conduit 10 and rotates therewith as the conduit 10 is being rotated in a clockwise direction as viewed from the right side of FIG. 2, in order to thread the coupling member 12 onto a few threads 38 of the conduit 36 for initial connection thereto. Once the conduit 36 is initially threaded, there is no further need to rotate the conduit 10, so that the conduit 10 can be supported or held in a conventional manner well known in the art.

In order to provide the swivel capability of the present invention, as shown in FIG. 3, the coupling member 12 is unthreaded from the threads 18 of the conduit 10, in a counter-clockwise direction when viewed from the right side, until the threads 24 of the coupling member 12 are positioned in the annular groove 20 of the conduit 10. At the same time, the threads 16 of the length of conduit 10 will be positioned in the annular groove 28 of the coupling member 12. The coupling member 12 is thus captured on the length of conduit 10, being free to rotate or swivel as long as the threads 24 are forced in the direction of the threads 16 of the conduit 10 so as not to re-engage the threads 18, and as long as the rotation of the coupling member 12 is in the clockwise direction when viewed from the right side of FIG. 3, so that the threads 16 and 24 will not engage and thereby cooperate to rotatably hold the coupling member 12 on the conduit 10. It will be noted that this is the exact rotational direction required to rotate the coupling member 12 for further threading the coupling member 12 onto the conduit 36. The coupling member 12 is further threaded onto the conduit 36 so that the seal ring 14 will be captured between the end face 40 of the length of conduit 36 and the end face 22 of the length of conduit 10 in order to provide an adequate seal.

Figures 4, 5:
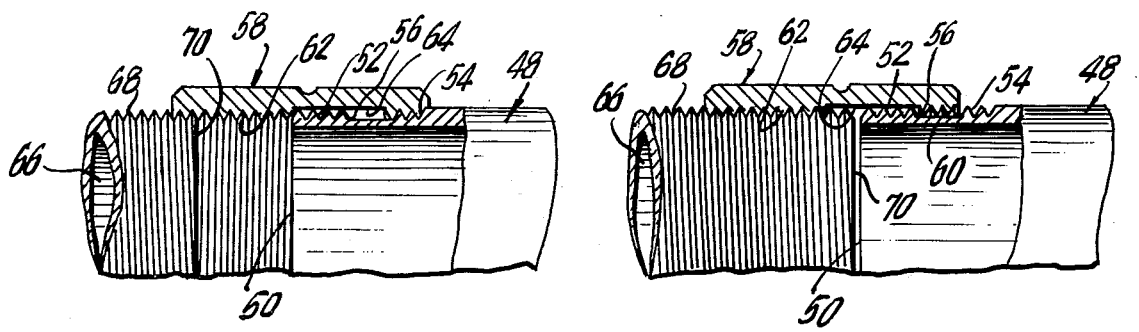
FIG. 4 is a fragmentary longitudinal elevational view, partially broken away and partially in section, illustrating an initial assembly step of an alternative embodiment of the present invention.
FIG. 5 is a fragmentary longitudinal elevational view, partially broken away and partially in section, illustrating the second embodiment of the present invention in the swivel mode of operation.

FIGS. 4 and 5 illustrate an alternative embodiment of the present invention wherein a seal ring is not employed as in the first described embodiment. A first length of conduit 48 (similar to conduit 10) having a transverse end face 50 is provided with first and second external left hand NS threads 52 and 54 (similar to threads 16 and 18 respectively) that are axially spaced apart in order to define an external annular groove 56 (similar to groove 20) therebetween. Coupling member 58 (similar to coupling member 12) is provided with internal left hand NS threads 60 (similar to threads 24) at one end thereof and a standard right hand pipe thread 62 (similar to threads 26) at the opposite end thereof in order to define an annular groove 64 (similar to groove 28) therebetween. The next adjacent length of conduit 66 (similar to conduit 36) is also provided with standard external pipe threads 68 (similar to threads 38) that are adapted to mate with the pipe threads 62 on the coupling member 58, and a transverse end face 70.

As in the first embodiment, a swivel connection is completed when the threads 60 of the coupling member 58 fall into the annular groove 56 of the length of conduit 48 and when the threads 52 of the length of conduit 48 fall into the internal annular groove 64 defined by the two sets of threads 60 and 62 of the coupling member 58, as shown in FIG. 5. With the threads 60 of the coupling member 58 matingly engaging the threads 54 of the length of conduit 48, a temporary locking will be achieved therebetween, so that the threads 62 of the coupling member 58 can easily be initially threaded onto the threads 68 of the conduit 66, as shown in FIG. 4, where the connection between the conduits 48 and 66 is carried out in the same manner as set forth above. It is noted that the temporary locking shown in FIG. 2 is established when the conduit end 22 comes to rest firmly against the sealing ring 14 after the threads 24 have made a few turns on the threads 18 of the conduit 10, while the temporary locking shown in FIG. 4 is established when the threads 54 on the conduit 48 runs out.

From the foregoing, it will be evident that the present invention provides an improved swivel connection for coupling together two adjacent lengths of conduits. By providing an annular groove between a pair of external left hand threads on one end of the length of conduit and by providing axially spaced apart internal threads in the coupling member, with one set of the coupling member threads being left hand in order to mate with the left hand threads on the conduit and with the other set of threads of the coupling member being right hand threads in order to mate with the right hand threads on the next adjacent length of conduit, the swiveling function of the present invention is achieved. When the left hand threads of the coupling member are temporarily locked on the inner positioned left hand threads of the first length of conduit, the right hand threads of the next adjacent conduit can easily be matingly engaged by the right hand threads of the coupling member.

Numerous alterations of the structure herein disclosed will suggest themselves to those skilled in the art. However, it is to be understood that the present disclosure relates to preferred embodiments of the invention which are for the purpose of illustration only and which are not to be construed as a limitation of the invention.

What is claimed is:
1. A swivel conduit coupling assembly comprising:
   a. a first conduit having:
      1. a first set of threads formed proximate a first end thereof, said first set of threads on said first conduit being arranged to advance in a first axial direction;
      2. a second set of threads formed adjacent and axially inward of said first set of threads, said second set of threads on said first conduit being arranged to advance in said first axial direction; and
      3. a first annular, axially elongated groove formed intermediate said first and second sets of threads on said first conduit; and
   b. a coupling member having:
      1. a third set of threads arranged to advance in a second axial direction that is opposite to said first axial direction to thereby matingly engage said first and second sets of threads on said first conduit;
      2. a fourth set of threads arranged to advance in said first axial direction, said fourth set of threads of said coupling member being adapted to mate with threads on a second conduit that is to be coupled to said first conduit; and
      3. a second annular, axially elongated groove intermediate said third and fourth sets of threads on said coupling member; and
   c. said third set of threads of said coupling member being movable from a temporarily locked position, with respect to said first conduit, to an unlocked position when said coupling member is free to rotate relative to said first conduit, said third set of threads of said coupling member being engaged in said second set of threads of said first conduit in said temporarily locked position.

2. A coupling assembly according to claim 1, wherein said first and second sets of threads and said first annular groove on said conduit are formed externally thereof and wherein said third and fourth sets of threads and said second annular groove of said coupling member are formed internally thereof.

3. A coupling assembly according to claim 2, further including means for providing a seal between said first conduit and the second conduit.

4. A coupling assembly according to claim 3, wherein said seal means comprises a ring positioned at an end of said second groove in said coupling member that is adjacent to said fourth set of threads thereof.

5. A coupling assembly according to claim 4, wherein said ring is resilient.

6. A coupling assembly according to claim 1, wherein said first and second sets of threads on said first conduit and said third set of threads on said coupling member are left handed threads and wherein said fourth set of threads on said coupling member is right handed threads.

7. A coupling assembly according to claim 1, wherein there are from about 1 ½ to 2 threads in said second set of threads on said first conduit.

8. A coupling assembly according to claim 1, wherein the axial length of said second groove on said coupling member is greater than the axial extent of said first set of threads on said first conduit, the axial length of said first groove on said first conduit being greater than the axial extent of said third set of threads on said coupling member, said first set of threads on said first conduit being positioned in said second groove on said coupling member and said third set of threads on said coupling member being positioned in said first groove on said first conduit to permit said coupling member and said first conduit to be relatively rotatable about their longitudinal axes with respect to each other to define said unlocked position.

* * * * *